United States Patent
Nagasaki et al.

(10) Patent No.: US 7,609,263 B2
(45) Date of Patent: Oct. 27, 2009

(54) DRAWING PROCESSING APPARATUS AND METHOD FOR COMPRESSING DRAWING DATA

(75) Inventors: Tanio Nagasaki, Tokyo (JP); Teruyuki Nakahashi, Tokyo (JP); Minoru Takahata, Tokyo (JP); Yasuhiro Moriyama, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 328 days.

(21) Appl. No.: 11/348,523

(22) Filed: Feb. 6, 2006

(65) Prior Publication Data

US 2006/0176316 A1  Aug. 10, 2006

(30) Foreign Application Priority Data

Feb. 10, 2005  (JP)  ............... 2005-034309

(51) Int. Cl.
*G09G 5/00*  (2006.01)
(52) U.S. Cl. .................. 345/421; 345/419; 345/592; 345/621; 345/631; 382/245
(58) Field of Classification Search ........... 345/419, 345/421, 621, 592, 631; 382/245
See application file for complete search history.

(56) References Cited

U.S. PATENT DOCUMENTS 6,525,722 B1 * 2/2003 Deering ............... 345/419
7,202,876 B2 * 4/2007 Fushiki et al. ............ 345/592
7,234,645 B2 * 6/2007 Silverbrook et al. ........ 235/494

FOREIGN PATENT DOCUMENTS

JP  08-163560  6/1996
JP  2003-531446  10/2003

OTHER PUBLICATIONS

Notification of Reason(s) for Refusal, dated Dec. 9, 2008, for corresponding Japanese Patent Application 2005-034309.

* cited by examiner

*Primary Examiner*—Kimbinh T Nguyen
(74) *Attorney, Agent, or Firm*—Katten Muchin Rosenman LLP

(57) ABSTRACT

A drawing processing apparatus is provided to solve the problems in which pixels of a drawing primitive with sub-pixel information may have an increased amount of data causing a burden on implementation. A setup processing unit sets up various parameters to allow a digital differential analyzer (DDA) to process the stream of a drawing primitive supplied from a primitive input unit. The DDA performs DDA processing on the drawing primitive supplied from the setup processing unit for conversion into pixel data. The DDA performs the DDA processing on a per rectangular pixel set basis along a scan line to output the pixel data of the drawing primitive on a per rectangular pixel set basis. A compression encoding unit encodes the sub-pixel information of each pixel contained in the rectangular pixel set by run length encoding for output to a FIFO buffer.

12 Claims, 7 Drawing Sheets

DRAWING PROCESSING APPARATUS AND METHOD FOR COMPRESSING DRAWING DATA

BACKGROUND OF THE INVENTION

1. Field of the Invention

The present invention relates to a drawing processing apparatus for computing drawing data and a method for compressing drawing data.

2. Description of the Related Art

In general, the three-dimensional (3D) computer graphics utilizes a polygon model to represent an object in a 3D space using a number of polygons. In drawing a polygon model, shading is performed such that a light source, the location of an eye point, and the surface light reflectivity of an object are taken into account to shade the surface of a polygon. To produce a highly photorealistic image, texture mapping is also performed to map a texture image to the surface of a polygon model.

Displaying pixel colors using bit maps on the screen of a display device may result in an undesirably drawn image such as a diagonal line appearing as a stepped line or a thinner line than one pixel disappearing due to a limited resolution. This phenomenon is referred to as "aliases" or "jaggies." In order to improve the drawing quality of computer graphics, anti-aliasing is performed to alleviate such jaggies.

There is a technique called over sampling or super sampling, which is available for anti-aliasing. According to this technique, one pixel is divided into a unit of smaller sub-pixels to thereby produce drawing data temporarily at a higher resolution. When an image is actually output on a display device, the sub-pixels are reduced into one-pixel information, and the pixel data is output on the display device at the original resolution. Upon final conversion into one-pixel data, such processing as averaging color values is performed on a per sub-pixel unit basis. For example, assuming that one pixel is a 4 by 4 matrix of 16 sub-pixels in total, the one pixel is drawn virtually on a per sub-pixel basis at a resolution increased four times for the row and column. When being actually displayed, the row and column are reduced to one fourth, so that the color values of the total of 16 virtual sub-pixels are averaged to be employed as the color value of the original one pixel.

In the aforementioned over sampling, assuming that a pixel is a virtual matrix of multiple sub-pixels, the set of sub-pixels is computed for drawing. Accordingly, this causes the amount of computation to increase in proportion to the number of sub-pixels, thereby requiring correspondingly increased time for drawing processing. The amount of data to be computed for drawing processing also increases in proportion to the number of sub-pixels, thereby resulting in an increase in the required amount of memory. As such, an attempt to improve the quality of drawing by anti-aliasing would cause an increase in pixel information, thus resulting in the hardware being further burdened in both aspects of the required amount of computation and memory.

SUMMARY OF THE INVENTION

The present invention has been achieved in view of the foregoing problems. It is a general purpose of the present invention to provide a drawing processing technique which is efficient in terms of the amount of required computation and memory and provides high-quality drawing.

To solve the aforementioned problems, an embodiment of the present invention is to provide a drawing processing apparatus which includes a pixel generation unit and a compression encoding unit. The pixel generation unit scans a drawing area on a per rectangular pixel set basis, the rectangular pixel set containing at least one pixel, and determines on a per sub-pixel basis whether a sub-pixel is inside or outside a drawing primitive to convert the drawing primitive into pixel data containing information relating to the sub-pixel. The compression encoding unit compressively encodes the information relating to the sub-pixel on the per rectangular pixel set basis by run length encoding in accordance with the number of the same contiguous pieces of data.

According to this embodiment, a pixel is provided with information relating to a sub-pixel, and a determination is made on a per sub-pixel basis as to whether the sub-pixel is inside or outside a drawing primitive. This makes it possible to reduce the required amount of computation and memory, and improve the quality of drawing. Furthermore, the information relating to the sub-pixels within the rectangular pixel set can be compressed to reduce the amount of data, thereby further decreasing the required amount of memory.

Another embodiment of the present invention is also to provide a drawing processing apparatus which includes a rasterizer and a shader. The rasterizer rasterizes a drawing primitive on a per rectangular pixel set basis, the rectangular pixel set containing at least one pixel, to produce pixel data of the drawing primitive. The shader receives the pixel data of the drawing primitive from the rasterizer on the per rectangular pixel set basis to perform drawing computation on the drawing primitive. The rasterizer includes a compression encoding unit which compressively encodes information relating to the sub-pixels on the per rectangular pixel set basis by run length encoding in accordance with the number of the same contiguous pieces of data. The shader includes a decompressing unit which decompresses the information relating to the compressively encoded sub-pixels for the pixel data of the drawing primitive received on the per rectangular pixel set basis from the rasterizer.

According to this embodiment, the information relating to the sub-pixels within the rectangular pixel set can be compressed to reduce the amount of data of a rectangular pixel set supplied from the rasterizer to the shader. This makes it possible to reduce the capacity of a buffer required for data transfer as well as the time required for data transfer.

A further embodiment of the present invention is to provide a method for compressing drawing data. According to this method, a drawing primitive is rasterized on a per rectangular pixel set basis, the rectangular pixel set containing at least one pixel, and information relating to sub-pixels is compressively encoded on the per rectangular pixel set basis by run length encoding in accordance with the number of the same contiguous pieces of data.

Another embodiment of the present invention is also to provide a method for compressing drawing data. The method includes: scanning a drawing area on a per rectangular pixel set basis, the rectangular pixel set containing at least one pixel, to determine on a per sub-pixel basis whether a sub-pixel is inside or outside a drawing primitive; and compressively encoding information relating to the sub-pixel on the per rectangular pixel set basis by run length encoding in accordance with the number of the same contiguous pieces of data.

Another embodiment of the present invention is to provide a data structure of drawing data of a drawing primitive. The drawing data contains pixel data of the drawing primitive rasterized on a per rectangular pixel set basis, the rectangular pixel set containing at least one pixel, and information relating to sub-pixels is compressively encoded on the per rectangular pixel set basis by run length encoding in accordance with the number of the same contiguous pieces of data.

Another embodiment of the present invention is to provide a program. The program makes a computer execute receiving, on a per rectangular pixel set basis, pixel data of a drawing primitive rasterized on the per rectangular pixel set basis, the rectangular pixel set containing at least one pixel; and compressively encoding information relating to sub-pixels on the per rectangular pixel set basis by run length encoding in accordance with the number of the same contiguous pieces of data.

Another embodiment of the present invention is also to provide a program. This program makes a computer execute: receiving drawing data with information relating to sub-pixels compressively encoded by run length encoding on a per rectangular pixel set basis, including pixel data of a drawing primitive rasterized on the per rectangular pixel set basis, the rectangular pixel set containing at least one pixel; and acquiring a run length code indicative of a starting position at which a significant value appears for the first time in each row or each column of a data matrix of the sub-pixels within the rectangular pixel set and the number of contiguous significant values from the starting position in the row or column to decode the data matrix of the sub-pixels within the rectangular pixel set on a per row or per column basis.

Incidentally, any combinations of the foregoing components, and any conversions of expressions of the present invention from/into methods, apparatuses, systems, computer programs, data structures, and the like are also intended to constitute applicable embodiments of the present invention.

DETAILED DESCRIPTION OF THE INVENTION

Figure 1:
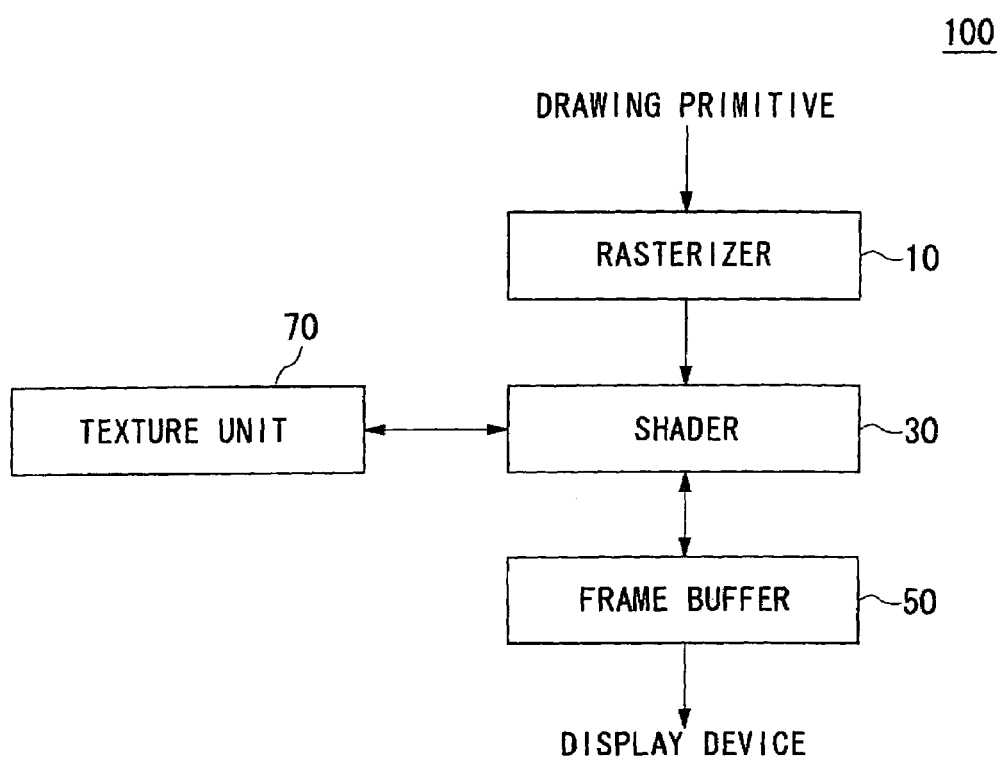
FIG. 1 is a view illustrating the configuration of a drawing processing apparatus according to an embodiment.

FIG. 1 is a view illustrating the configuration of a drawing processing apparatus 100 according to an embodiment. The drawing processing apparatus 100 performs rendering processing to produce drawing data that is displayed on a two-dimensional (2D) screen based on 3D model information.

A rasterizer 10 acquires vertex data of a primitive to be drawn from a memory device, other processors, or a vertex shader, and then converts the vertex data into pixel information corresponding to the drawing screen. A drawing primitive is a unit of drawn geometries such as points, lines, triangles, and squares of a polygon model used to represent a 3D object, as well as data represented in the unit of a vertex. The rasterizer 10 carries out view transformation for converting a drawing primitive in a 3D space into a graphics on a drawing plane by perspective transformation as well as into quantized pixels on a per-column basis while scanning the graphics on the drawing plane horizontally across the drawing plane.

The rasterizer 10 develops the drawing primitive pixel by pixel, so that calculations are carried out for each pixel to yield pixel information including color values expressed by three primary colors or RGB, alpha ($\alpha$) values indicative of transparency, Z values indicative of depths, and UV coordinate values or parameter coordinates for referring to texture attributes.

The rasterizer 10 performs the aforementioned rasterization on a per rectangular pixel set basis to sequentially supply, while buffering, the rasterized rectangular pixel set to a shader 30 on a per rectangular pixel set basis. The rectangular pixel set supplied from the rasterizer 10 to the shader 30 is pipelined at the shader 30. As can be seen from the foregoing, the rectangular pixel set is a collection of pixels processed by the rasterizer 10 at a time and serves as a unit of rasterization as well as a unit of drawing computation at the shader 30.

Here, the rectangular pixel set is a rectangular pixel area of a given size on a drawing plane, the area containing one or more pixels. As discussed later, each pixel includes a plurality of smaller sub-pixels into which one pixel is virtually divided.

The shader 30 determines the color value of a pixel by shading based on the pixel information yielded by the rasterizer 10. Further, when texture mapping is performed, the shader 30 combines texture color values obtained from a texture unit 70 to calculate the final color value of the pixel and then write the pixel data on a frame buffer 50.

The texture unit 70 maps texture data to a pixel processed at the shader 30. The position of a texture mapped to a pixel on a polygon surface is expressed with the UV coordinate system or 2D parameter coordinates. The texture unit 70 acquires the UV coordinate values of a texture mapped to the pixel from the shader 30 to convert the UV coordinate values into a reference address, and thereafter acquires a color value corresponding to the reference address from the texture to supply the color value to the shader 30.

The shader 30 also performs processing such as fogging or alpha blending on the drawing data stored in the frame buffer 50 to determine the final color value of the pixel, which is then used to update the pixel data in the frame buffer 50.

The frame buffer 50 stores the pixel data, produced at the shader 30, in screen coordinates, and the stored pixel data may be a final drawn image or an intermediate image that is being shaded. The pixel data stored in the frame buffer 50 is output to and displayed on a display device.

Figure 2:
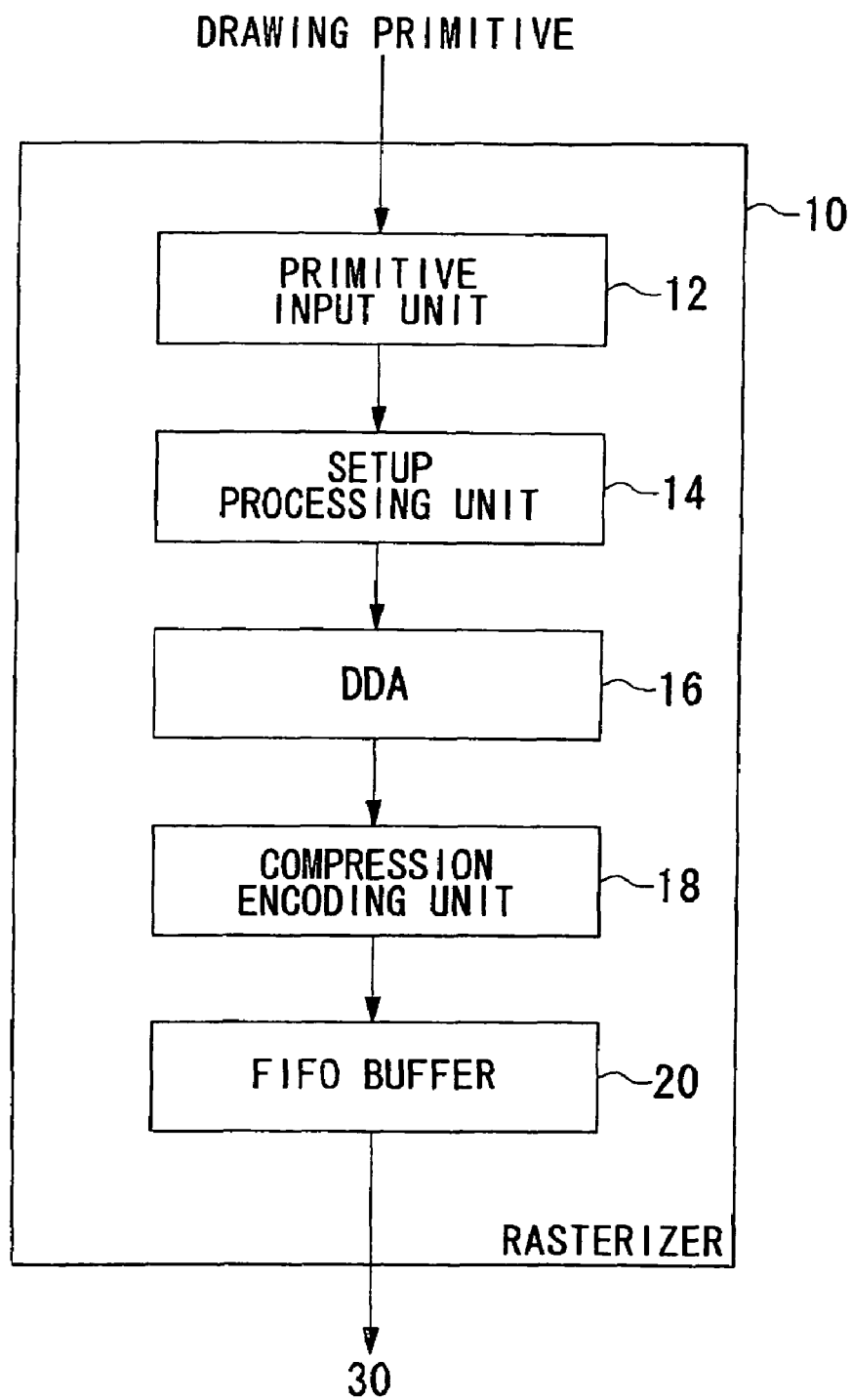
FIG. 2 is a view illustrating the configuration of a rasterizer of FIG. 1.

FIG. 2 shows the configuration of the rasterizer 10. A primitive input unit 12 creates a stream containing vertex coordinates of a drawing primitive received from the vertex shader or the like and parameters, and then provides the stream to a setup processing unit 14. The setup processing unit 14 sets up various parameters for a DDA (Digital Differential Analyzer) to process the stream of the drawing primitive. More specifically, the setup processing unit 14 sets a bounding box that is defined by a common area of the tangent rectangle of the drawing primitive projected onto the drawing plane and a scissoring boundary area, as well as various parameters for the DDA processing such as an edge coefficient.

The setup processing unit 14 supplies to a DDA 16 the drawing primitive data that has been set up. The DDA 16 performs the DDA processing on the drawing primitive supplied from the setup processing unit 14 in accordance with the various parameters defined by the setup processing unit 14 for conversion into pixel data. The DDA 16 performs the pixel generation processing on a per rectangular pixel set basis along a scan line, thereby outputting the pixel data of the drawing primitive on a per rectangular pixel set basis for supply to a compression encoding unit 18.

In general, the larger the area of the drawing primitive supplied to the DDA 16, the larger the number of pixels created from the drawing primitive becomes. This results in a larger number of rectangular pixel sets being created. Suppose that a drawing primitive close to a viewpoint needs to be drawn at a finer level of detail. In this case, the pixels to be created from the drawing primitive are also increased in number, thus resulting in a larger number of rectangular pixel sets being created.

In the setup processing unit 14, the drawing primitive is expressed in vertex data, and only a small amount of data is available. However, after the pixel generation processing by the DDA 16, the number of pixels as well as the amount of data is increased. Here, the amount of data is not known until the pixel generation processing is completed. Accordingly, in supplying the pixel data of a drawing primitive from the rasterizer 10 to the shader 30, the rasterizer 10 typically accumulates the pixel data of the drawing primitive temporarily in a buffer and then supplies the pixel data to the shader 30. Since this buffer has a limited storage capacity due to the design of hardware, compression of pixel data by compressive encoding, which will be discussed below, is critical in order to reduce the required capacity of memory and the mounting area.

The compression encoding unit 18 compressively encodes the pixel data of a drawing primitive supplied from the DDA 16 on a per rectangular pixel set basis and outputs the resulting data to a FIFO buffer 20. The compression encoding unit 18 compressively encodes the sub-pixel information of each pixel contained in the rectangular pixel set by run length encoding. The rectangular pixel sets stored in the FIFO buffer 20 are output for supply to the shader 30 in the order in which the rectangular pixel sets have arrived at the buffer.

Figure 3:
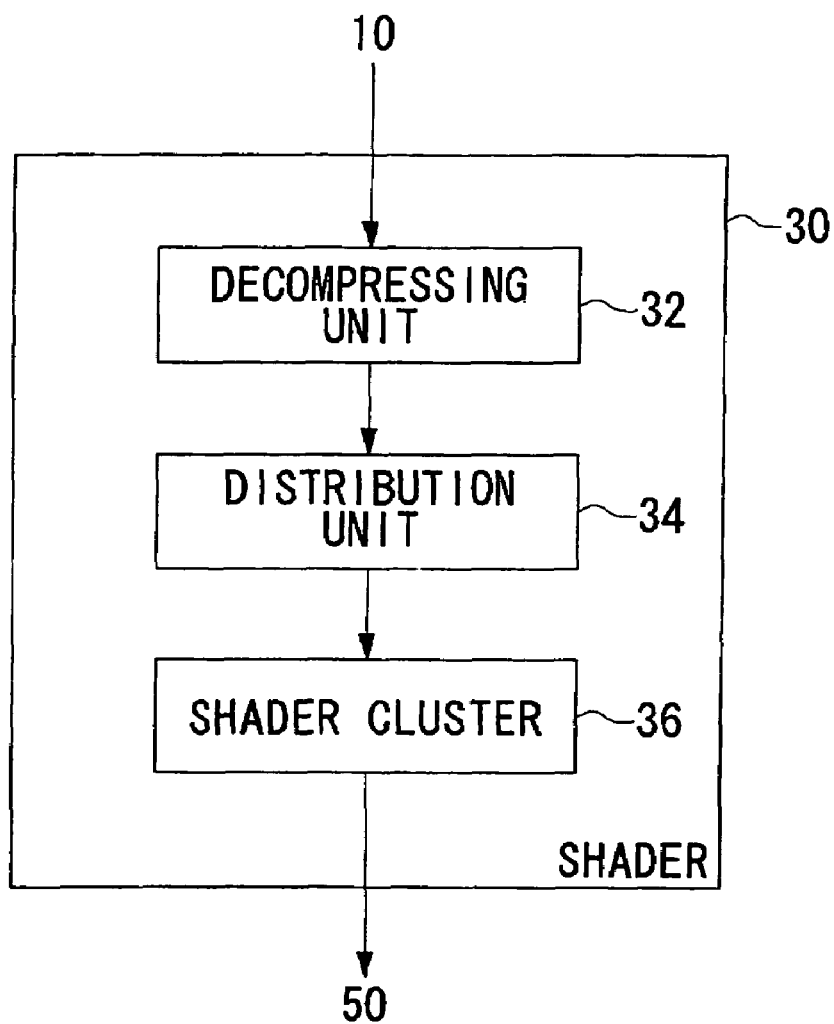
FIG. 3 is a view illustrating the configuration of a shader of FIG. 1.

FIG. 3 shows the configuration of the shader 30. A decompressing unit 32 receives the pixel data of the drawing primitive output on a per rectangular pixel set basis from the FIFO buffer 20 of the rasterizer 10. The rectangular pixel set received by the decompressing unit 32 has sub-pixel information compressed by run length encoding at the compression encoding unit 18 of the rasterizer 10. The decompressing unit 32 decodes and decompresses the sub-pixel information of the rectangular pixel set encoded by run length encoding. This allows the original rectangular pixel set to be obtained which was available before having been compressively encoded by the compression encoding unit 18. The decompressing unit 32 provides the restored rectangular pixel set to a distribution unit 34.

The distribution unit 34 distributes the rectangular pixel set restored by the decompressing unit 32 to a shader cluster 36. The shader cluster 36 includes a plurality of drawing pipelines that operate in parallel, and each pipeline processes respectively responsible pixel data, thereby concurrently executing the drawing computation on the rectangular pixel sets distributed by the distribution unit 34. The shader cluster 36 outputs the results of the drawing computation to the frame buffer 50.

Figure 4A:
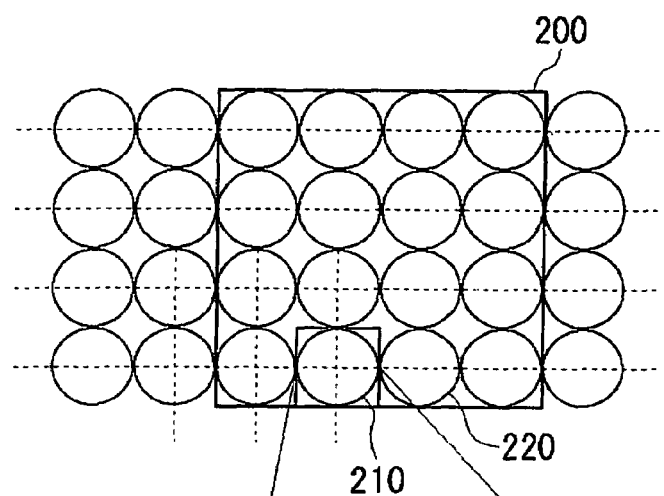
FIGS. 4A and 4B show explanatory views of a rectangular pixel set serving as a unit of rasterization by a rasterizer of FIG. 2.
Figure 4B:
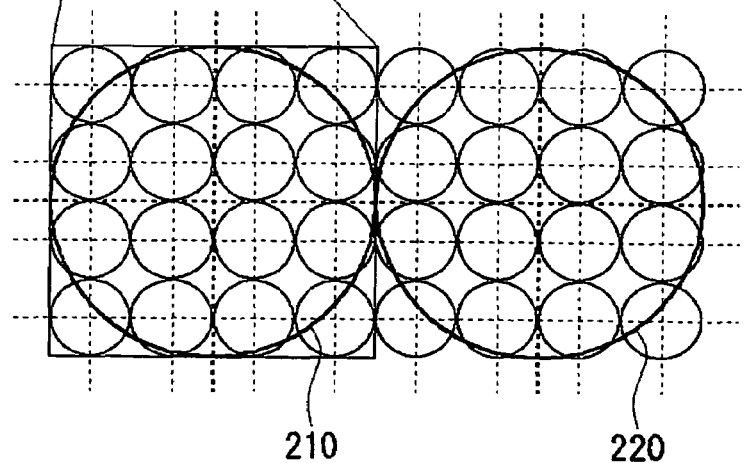

FIGS. 4A and 4B are explanatory views illustrating a rectangular pixel set 200 serving as a unit of rasterization by the rasterizer 10. FIG. 4A shows the rectangular pixel set 200 defined for a matrix of pixels on a drawing plane. Referring to FIG. 4A, pixels are indicated with circles, and the rectangular pixel set 200 is shown here by way of example as a square pixel area containing a 4 by 4 matrix of a total of 16 pixels.

FIG. 4B is an enlarged view illustrating pixels 210 and 220 contained in the rectangular pixel set 200 of FIG. 4A. The pixels 210 and 220 each contain a plurality of smaller sub-pixels into which the pixel is virtually divided. Here, by way of example, each of the pixels 210 and 220 contains a 4 by 4 matrix of 16 sub-pixels in total. The plurality of sub-pixels contained in each pixel is referred to as a sub-pixel mask.

In the example shown in FIGS. 4A and 4B, the rectangular pixel set 200 contains 16 pixels, and each pixel contains 16 sub-pixels. Therefore, the rectangular pixel set 200 contains a total of 256 sub-pixels as a whole.

The DDA 16 scans the drawing primitive projected onto a drawing plane on a per rectangular pixel set 200 basis for conversion into pixel data. At this time, in a normal processing mode, the DDA 16 determines on a per-pixel basis whether each pixel within the rectangular pixel set 200 stays inside or outside the drawing primitive. However, in a processing mode using the sub-pixel mask, the DDA 16 determines on a per sub-pixel basis whether each sub-pixel is inside or outside the drawing primitive. In the processing mode using the sub-pixel mask, the aforementioned inside/outside determination may be made both on a per-pixel basis and on a per sub-pixel basis.

When having made an inside/outside determination on a per sub-pixel basis, the DDA 16 provides a determined value according to the inside/outside determination to each sub-pixel. If a sub-pixel is inside the drawing primitive, the sub-pixel is provided with a significant value. For example, a binary inside/outside determined value is employed as 1 for a sub-pixel inside the drawing primitive and 0 for an outside one. Accordingly, the sub-pixel can be sufficiently provided with one-bit information. The rectangular pixel set 200 containing 256 sub-pixels is provided with pixel data, such as RGB values and alpha values, on the 16 pixels within the rectangular pixel set 200, and 256-bit sub-pixel information as well. The sub-pixel information of the rectangular pixel set 200 is given in the form of a two-dimensional array with each element being a binary value.

Figure 5C:
FIGS. 5A, 5B, and 5C show explanatory views of the relationship between a drawing primitive projected onto a drawing plane and a rectangular pixel set.
Figure 5B:
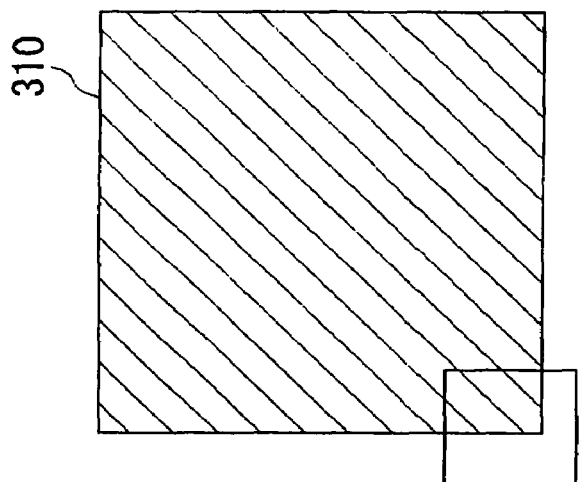
Figure 5A:
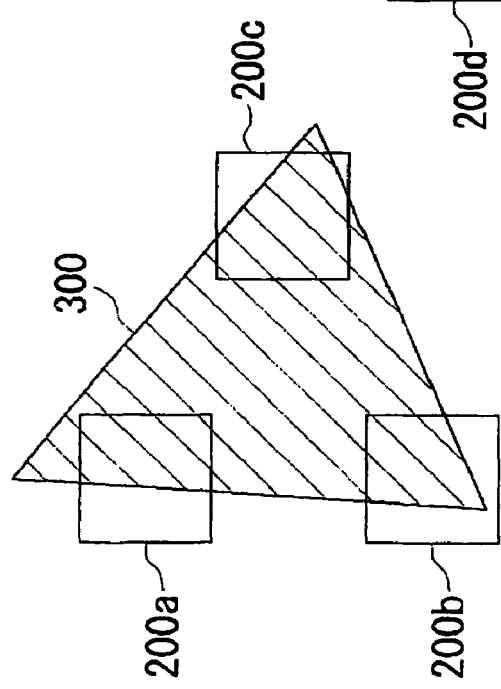

FIGS. 5A to 5C are explanatory views illustrating the relationship between a drawing primitive projected onto a drawing plane and the rectangular pixel set 200. FIG. 5A shows rectangular pixel sets 200a, 200b, and 200c employed when scanning a drawing area for rasterization on a triangular drawing primitive 300 projected onto a drawing plane. The inside of the drawing primitive is indicated with diagonal lines. Each of the areas inside the drawing primitive 300 contained in the rectangular pixel sets 200a, 200b, and 200c is one convex area within the respective rectangular pixel sets 200a, 200b, and 200c and has no discontinuation.

FIG. 5B shows a rectangular pixel set 200d on a square drawing primitive 310 projected onto a drawing plane. FIG. 5C shows a rectangular pixel set 200e on a linear drawing primitive 320 projected onto a drawing plane. In any cases, each of the areas inside the drawing primitives 310 and 320 contained in the rectangular pixel sets 200d and 200e is one convex area having no discontinuation within the respective rectangular pixel sets 200d and 200e.

As in the foregoing, the area inside the drawing primitives 300, 310, and 320 contained in the rectangular pixel sets 200a to 200e is not divided into two areas and has no discontinuations because all the projected images 300, 310, and 320 of the drawing primitives on the a drawing plane are a convex polygon. Here, a polygon being a convex polygon means that any point on a line connecting between any two points on the polygon is always contained in the polygon. More generally, if a drawing primitive is a convex area, the drawing area of a drawing primitive within a rectangular pixel set is naturally a convex area that is always one area with no discontinuation. Attention is focused on this property to perform compressively encoding on sub-pixel information of a rectangular pixel set by the compression encoding unit 18 of the rasterizer 10.

Figures 6A, 6B:
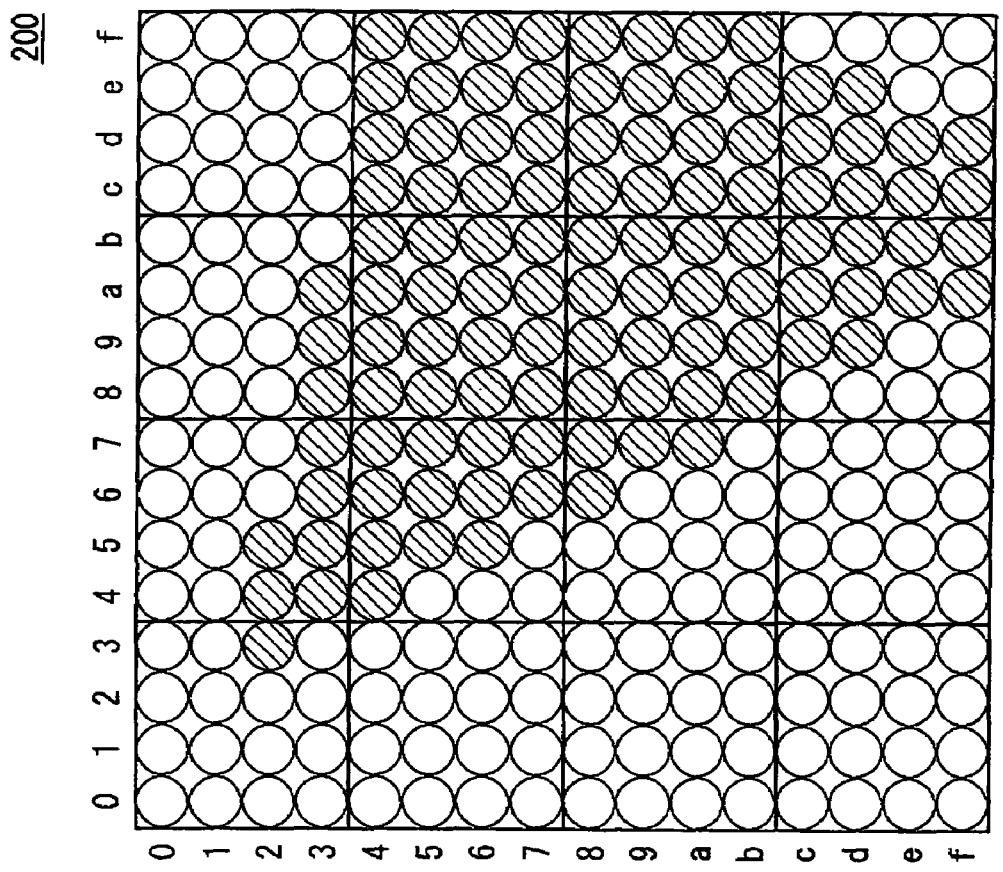
FIGS. 6A and 6B show explanatory views of the run length encoding of sub-pixel information contained in a rectangular pixel set.

FIGS. 6A and 6B are explanatory views illustrating the run length encoding of sub-pixel information contained in the rectangular pixel set 200.

Referring to FIG. 6A, the rectangular pixel set 200 includes a 4 by 4 matrix of 16 pixels in total, each pixel being represented by a square grid. Each pixel also includes a total of 16 sub-pixels in a 4 by 4 matrix, each sub-pixel being indicated with a small circle. The sub-pixels are arrayed in a two-dimensional matrix of 16 rows and 16 columns, the number of each of the rows and columns being indicated with a hexadecimal number of 0 to f.

The diagonally shaded sub-pixels are such that the DDA 16 has determined to be inside a drawing primitive. As described in relation to FIGS. 5A to 5C, the drawing primitive is a convex polygon, and thus the sub-pixels determined to be inside the drawing primitive are contiguous with no discontinuation within the rectangular pixel set 200. That is, in each row of the rectangular pixel set 200, the sub-pixels with a bit value of 1 are contiguous and never discontinued by the presence of a sub-pixel of a bit value of 0.

As an example, take a bit train of the sub-pixels in row 2 of the rectangular pixel set 200. The sub-pixels of a bit value of 1 continue from column 3 to column 5 ending at column 5, and thereafter no sub-pixels of a bit value of 1 are present. Therefore, the information of the bit train of sub-pixels in row 2 can be uniquely represented with a value "3" indicating the starting point of the sub-pixels of a bit value of 1 and a length "3" of the contiguous sub-pixels of a bit value of 1.

Similarly, in the case of a bit train of sub-pixels in row 3 of the rectangular pixel set 200, the sub-pixels of a bit value of 1 continue from column 4 to column "a," and thereafter no sub-pixels of a bit value of "1" are present. Therefore, the information of the bit train of sub-pixels in row 3 can be uniquely represented with a value "4" indicating the starting point of the sub-pixels of a bit value of 1 and a length "7" of the contiguous sub-pixels of a bit value of 1.

In this manner, focusing attention on a partial train of a bit value of 1, the bit train of sub-pixels in each row of the rectangular pixel set 200 can be uniquely represented with the "starting point" of a bit value of 1 and its "length." The compression encoding unit 18 employs the "starting point" and the "length" as a run length code to encode the bit train of sub-pixels in each row of the rectangular pixel set 200.

FIG. 6B shows data indicative of the bit train of sub-pixels in each row of the rectangular pixel set 200 of FIG. 6A, each bit train being encoded by run length encoding using the "starting point" and the "length." FIG. 6B shows the run length codes from row 0 to row "f" of the rectangular pixel set 200 in that order. Both the starting position and the length of sub-pixels of a bit value of 1 in each row take on hexadecimal numbers 0 to f, and thus can be each represented with four-bit information. In FIG. 6B, the values of starting points and lengths are expressed in hexadecimal form with each number having at its top a "0x," which indicates that the number is a hexadecimal number.

Row 0 of the rectangular pixel set 200 has no sub-pixels of a bit value of 1, and thus has a length of 0x0. In this case, the value of the starting point is "Don't care," and may be "0x0," for example. The run length code of row 1 is the same as that of row 0. The run length code of row 2 has "a length of 0x3 and a starting point of 0x3," the run length code of row 3 has "a length of 0x7 and a starting point of 0x4," and the run length code of row 4 has "a length of 0xc and a starting point of 0x4." In this manner, the run length codes of four rows from row 0 to row 3 provide encoded data of information on the sub-pixels contained in the four pixels of the first row.

Subsequently, in the same manner, the four pixels of the second row are encoded such that the run length code of row 4 has "a length of 0xc and a starting point of 0x4," the run length code of row 5 has "a length of 0xb and a starting point of 0x5," the run length code of row 6 has "a length of 0xb and a starting point of 0x5," and the run length code of row 7 has "a length of 0xa and a starting point of 0x6." The four pixels of the third row and the four pixels of the fourth row are also encoded in the same manner. As such, in the whole rectangular pixel set 200, the sub-pixel information of each row is converted into a run length code of the "length" and the "starting point" as shown in FIG. 6B.

The sub-pixel information of each row of the rectangular pixel set 200 is encoded into a code of a total of 8 bits, i.e., four bits for the length and the other four bits for the starting point. Accordingly, the sub-pixel information of the total of 16 rows of the whole rectangular pixel set 200 is converted into code data of 8 bits times 16 equal to 128 bits in total. When compared with the original sub-pixel information of the rectangular pixel set 200, i.e., 16 bits times 16 equal to 256 bits, this shows that the amount of data has been compressed to one half with a good compression ratio. This compression ratio can be always obtained so long as a drawing primitive projected onto a drawing plane is a convex polygon or more generally a convex area.

Accordingly, when the rectangular pixel set 200 contains a 16 by 16 matrix of sub-pixels equal to 256 sub-pixels in total, the FIFO buffer 20 can only have a capacity for sequentially storing, in a FIFO fashion, the sub-pixel information of the rectangular pixel set 200 having been compressed into 128 bits. Thus, the width of a bus for transferring the sub-pixel information can be 128 bits. Suppose that the sub-pixel information of 256 bits of the rectangular pixel set 200 is attempted to be stored as it is in the FIFO buffer 20. In this case, the width of a bus needs to be 256 bits, causing an increase in burden on implemented hardware such as wiring. However, the run length encoding according to this embodiment can halve the bus width for transferring data into and out of the FIFO buffer 20, thereby halving the mounting area.

In the aforementioned description, the run length encoding was performed on each row of the rectangular pixel set 200. However, since a bit train in the direction of the column has the same property, the run length encoding can also be performed on each column.

Furthermore, in the aforementioned description, the run length encoding was performed in accordance with the "starting point" and the "length." However, for a partial train of contiguous sub-pixels of a bit value of 1, two values indicative of the "starting point" and the "ending point" of the partial train can also be used to uniquely represent the bit train of sub-pixels in each row. Thus, the run length encoding may also be performed in accordance with the "starting point" and the "ending point." The difference between a "starting point" and a "ending point" gives a "length." Thus, the run length code of a "starting point" and a "ending point" is equivalent to and substantially not different from the run length code of a "starting point" and a "length."

In this manner, the rectangular pixel set 200 having the sub-pixel information encoded by run length encoding is temporarily stored in the FIFO buffer 20 and then supplied to the shader 30 on a first-come-first-served basis. In the shader 30, the decompressing unit 32 restores the bit train of the original sub-pixel information on a per-row basis in accordance with the code of a "starting point" and a "length" of each row of the rectangular pixel set 200. This provides the rectangular pixel set 200 that contains the original 256-bit sub-pixel information.

Figure 7:
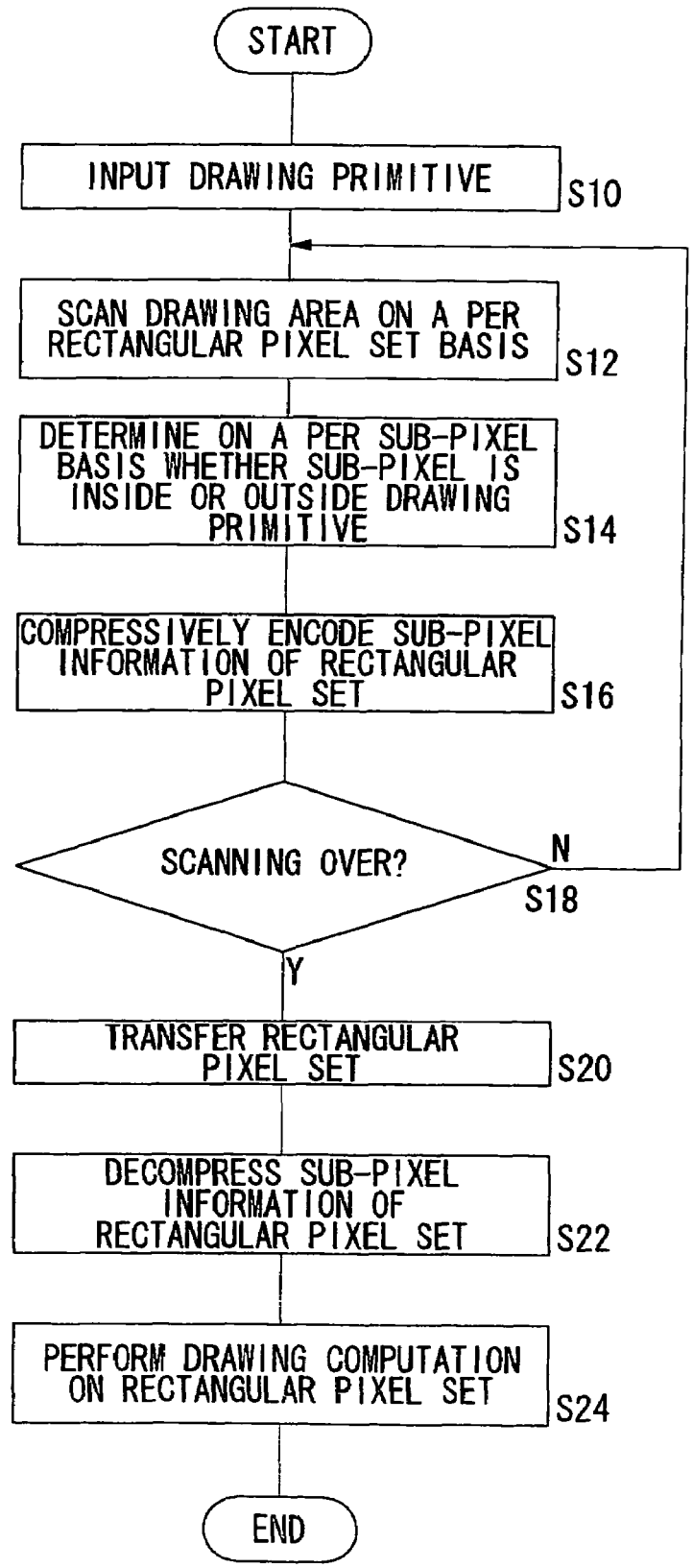
FIG. 7 is an explanatory flowchart showing the drawing procedure provided by the drawing processing apparatus according to the embodiment.

FIG. 7 is a flowchart showing the drawing processing procedure provided by the drawing processing apparatus 100.

The primitive input unit 12 of the rasterizer 10 receives the input of a drawing primitive, and the setup processing unit 14 performs setup processing on the drawing primitive (S10). The DDA 16 scans the drawing area of the drawing primitive projected onto a drawing plane on a per rectangular pixel set basis (S12), and in each pixel, determines on a per sub-pixel basis whether the sub-pixel is inside or outside the drawing primitive (S14).

The compression encoding unit 18 compressively encodes the sub-pixel information contained in the rectangular pixel set created by the DDA 16 by run length encoding (S16). A rectangular pixel set with its sub-pixel set having been compressively encoded is sequentially written on the FIFO buffer 20.

If there is an area to be further scanned by the DDA 16 in a bounding box defined in the setup processing unit 14 (N in S18), the process returns back to step S12 for the DDA 16 to continue scanning on a per rectangular pixel set basis, proceeding to S14 for the inside/outside determination on a per sub-pixel basis and then to S16 for compressively encoding the sub-pixel information.

If the DDA 16 has completed scanning across the drawing area on a per rectangular pixel set basis in a bounding box defined in the setup processing unit 14 (Y in S18), the pixel generation processing on the drawing primitive is ended. The rectangular pixel sets buffered in the FIFO buffer 20 are read out in a FIFO fashion, and the transferred to the shader 30 (S20). Here, the FIFO buffer 20 may sequentially transfer to the shader 30 the buffered rectangular pixel sets of a drawing primitive without waiting the completion of the rasterization of the drawing primitive.

The decompressing unit 32 of the shader 30 decompresses the sub-pixel information of the rectangular pixel set transferred from the FIFO buffer 20 by run length decoding (S22). The distribution unit 34 distributes the rectangular pixel set with the sub-pixel information having been restored to the shader cluster 36, which in turn performs drawing computation on the rectangular pixel set (S24).

In the aforementioned description, the compression encoding unit 18 encodes the sub-pixel information in one rectangular pixel set by run length encoding each time the DDA 16 creates the rectangular pixel set. However, after the DDA 16 has completed the rasterization of the whole drawing primitive and thus created all the rectangular pixel sets of the drawing primitive, the compression encoding unit 18 may encode all the rectangular pixel sets one by one by run length encoding.

As described above, this embodiment utilizes a sub-pixel mask or a plurality of sub-pixels into which a pixel is virtually divided, and a sub-pixel is provided with a one-bit determined value according to a determination of whether the sub-pixel is inside or outside an object being drawn. This sub-pixel information can be utilized for processing such as anti-aliasing to serve to improve the quality of drawing. The sub-pixel information has only one-bit value, and thus requires a less amount of computation and memory when compared with the over sampling technique for performing drawing simply at an increased resolution.

Furthermore, according to this embodiment, the sub-pixel information within the rectangular pixel set or a unit of drawing is compressed by run length encoding, thereby making it possible to further reduce the amount of memory required for storing the sub-pixel information. This also makes it possible to reduce the capacity of the FIFO buffer 20 required to buffer the rectangular pixel sets in supplying the rectangular pixel set from the rasterizer 10 to the shader 30, thereby reducing implementation costs such as for registers or wiring. Furthermore, since the sub-pixel information of a rectangular pixel set is compressed, the amount of data to be transferred as the rectangular pixel set from the rasterizer 10 to the shader 30 can be reduced and thus the processing speed is improved.

In the foregoing, the present invention has been described in accordance with the embodiment. It is to be understood by those skilled in the art that the embodiment is shown only by way of example, and various modifications may be made to the combinations of each component and each process without deviating from the scope of the present invention. Now, a description will be given to some of those modifications.

In the foregoing description, such a case has been explained in which a rectangular pixel set has a plurality of pixels. However, in a special case, a rectangular pixel set may contain only one pixel and the pixel is divided into a plurality of sub-pixels. Even in this case, the sub-pixel information can also be compressed by run length encoding. For example, suppose that the only one pixel contained in the rectangular pixel set is divided into a 16 by 16 matrix of 256 sub-pixels in total. This case can be treated exactly in the same way as the example described in the aforementioned embodiment.

A technique which defines a polygon smaller than the size of one pixel, or a so-called "micro-polygon," to represent a smoother curved surface is sometimes utilized in high-quality 3D computer graphics. The technique by the micro-polygon employs a drawing primitive that is divided into a size smaller than a pixel. In such a case, a sub-pixel mask or a plurality of sub-pixels into which one pixel is divided may be used. One pixel is considered to be a "rectangular pixel set" in the aforementioned description, and the sub-pixel information in the one pixel may be compressed in the same manner by run length encoding.

When a very small polygon such as the micro-polygon is used as a drawing primitive, a rectangular pixel set may be expected to contain a plurality of drawing primitives. For example, this may be the case where a rectangular pixel set contains two micro-polygon edges. In this case, a drawing area contained in the rectangular pixel set may not include one continuous area but two areas, and thus the run length encoding employing a "starting point" and a "length" as described in the aforementioned embodiment is not applicable. However, even in such a case, a general run length encoding technique can be employed to compress sub-pixel information. That is, in this technique, observing a 2D data matrix of sub-pixels in sequence from the start to the end, the number of contiguous zeros or contiguous ones is counted, and then the number is arranged in sequence.

To address such a case where a rectangular pixel set contains a plurality of drawing primitives, a determination unit may be provided upstream of the compression encoding unit 18 of the rasterizer 10 to determine whether the rectangular pixel set contains a plurality of drawing primitives. The determination unit provides a determined result to the compression encoding unit 18. Then, the compression encoding unit 18 may perform either the general run length encoding in accordance with the number of the same contiguous values when the rectangular pixel set contains a plurality of drawing primitives or the run length encoding in accordance with a "starting point" and a "length" when the rectangular pixel set contains only one drawing primitive.

Alternatively, the determination unit may not need to predetermine whether the rectangular pixel set contains a plurality of drawing primitives. In this case, the compression encoding unit 18 can determine whether there is a discontinuation in a bit train of a value of 1 in each row of the rectangular pixel set. It is thus possible to indirectly determine whether the rectangular pixel set contains a plurality of drawing primitives. Accordingly, without providing the determination unit, the compression encoding unit 18 may read in the values of a bit train in each row of the rectangular pixel set, in the course of which it can be determined whether the general run length encoding is performed in accordance with the number of the same contiguous values or the run length encoding in accordance with a "starting point" and a "length" is performed.

According to the aforementioned description, in the sub-pixel mask or a plurality of sub-pixels into which one pixel is divided, each sub-pixel is provided with information on a determined value from the determination of whether the sub-pixel is inside or outside the drawing primitive. However, other information than this may also be provided to the sub-pixel. This is because irrespective of the type of information provided to the sub-pixel, the compression encoding according to the present invention is applicable. In the aforementioned description, each sub-pixel is provided with one-bit information, but may also be provided with two or more bit information. In this case, in the run length encoding, since the sub-pixel is not provided with two values of 0 and 1 but three or more values, the number of the same contiguous values as well as the contiguous value has to be contained in the run length code for encoding.

What is claimed is:

1. A drawing processing apparatus comprising:
   a pixel generation unit which scans a drawing area on a per rectangular pixel set basis, the rectangular pixel set containing at least one pixel, and which determines on a per sub-pixel basis whether a sub-pixel is inside or outside a drawing primitive to convert the drawing primitive into pixel data containing information relating to the sub-pixel; and
   a compression encoding unit which compressively encodes the information relating to the sub-pixel on the per rectangular pixel set basis by run length encoding in accordance with the number of the same contiguous pieces of data, wherein
   the information relating to the sub-pixels is data, expressed in binary form, resulting from a determination made on a per sub-pixel basis as to whether a sub-pixel is inside or outside the drawing primitive, and the binary value of sub-pixels along with the non-binary value of pixels are run-length encoded.

2. The drawing processing apparatus according to claim 1, wherein
   the compression encoding unit produces a run length code indicative of the number of the same contiguous values in a data matrix of the sub-pixels within the rectangular pixel set, thereby compressively encoding the data matrix of the sub-pixels within the rectangular pixel set.

3. The drawing processing apparatus according to claim 1, wherein:
   the drawing primitive to be rasterized is a convex area on a drawing plane; and
   the compression encoding unit produces a run length code indicative of a starting position at which a significant value appears for the first time in each row or each column of the data matrix of the sub-pixels within the rectangular pixel set and the number of contiguous significant values from the staffing position in the row or column, thereby compressively encoding the data matrix of the sub-pixels within the rectangular pixel set on a per row or per column basis.

4. A drawing processing apparatus comprising:
   a rasterizer which rasterizes a drawing primitive on a per rectangular pixel set basis, the rectangular pixel set containing at least one pixel, to produce pixel data of the drawing primitive; and
   a shader which receives the pixel data of the drawing primitive from the rasterizer on the per rectangular pixel set basis to perform drawing computation on the drawing primitive, wherein:
   the rasterizer includes a compression encoding unit which compressively encodes information relating to the sub-pixels on the per rectangular pixel set basis by run length encoding in accordance with the number of the same contiguous pieces of data; and
   the shader includes a decompressing unit which decompresses the information relating to the compressively encoded sub-pixels for the pixel data of the drawing primitive received on the per rectangular pixel set basis from the rasterizer, wherein
   the information relating to the sub-pixels is data, expressed in binary form, resulting from a determination made on a per sub-pixel basis as to whether a sub-pixel is inside or outside the drawing primitive, and the binary value of sub-pixels along with the non-binary value of pixels are run-length encoded.

5. The drawing processing apparatus according to claim 4, further comprising a buffer which temporarily stores pixel data of the drawing primitive rasterized by the rasterizer to transfer the stored pixel data to the shader, and wherein
   the compression encoding unit compressively encodes the information relating to the sub-pixels in the rectangular pixel set to a size less than or equal to a transfer bus width of the buffer.

6. The drawing processing apparatus according to claim 4, wherein
   the compression encoding unit produces a run length code indicative of the number of the same contiguous values in a data matrix of the sub-pixels within the rectangular pixel set, thereby compressively encoding the data matrix of the sub-pixels within the rectangular pixel set.

7. The drawing processing apparatus according to claim 4, wherein:
   the drawing primitive to be rasterized is a convex area on a drawing plane; and
   the compression encoding unit produces a run length code indicative of a starting position at which a significant value appears for the first time in each row or each column of the data matrix of the sub-pixels within the rectangular pixel set and the number of contiguous significant values from the starting position in the row or column, thereby compressively encoding the data matrix of the sub-pixels within the rectangular pixel set on a per row or per column basis.

8. A method performed by a computer for compressing drawing data, comprising:
   rasterizing by the computer a drawing primitive on a per rectangular pixel set basis, the rectangular pixel set containing at least one pixel; and
   compressively encoding by the computer information relating to sub-pixels on the per rectangular pixel set basis by run length encoding in accordance with the number of the same contiguous pieces of data, wherein
   the information relating to the sub-pixels is data, expressed in binary form, resulting from a determination made on a per sub-pixel basis as to whether a sub-pixel is inside or outside the drawing primitive, and the binary value of sub-pixels along with the non-binary value of pixels are run-length encoded.

9. A method performed by a computer for compressing drawing data, comprising:

scanning by the computer a drawing area on a per rectangular pixel set basis, the rectangular pixel set containing at least one pixel, to determine on a per sub-pixel basis whether a sub-pixel is inside or outside a drawing primitive; and compressively encoding by the computer information relating to the sub-pixel on the per rectangular pixel set basis by run length encoding in accordance with the number of the same contiguous pieces of data, wherein the information relating to the sub-pixels is data, expressed in binary form, resulting from a determination made on a per sub-pixel basis as to whether a sub-pixel is inside or outside the drawing primitive, and the binary value of sub-pixels along with the non-binary value of pixels are run-length encoded.

10. A computer-readable recording medium having a computer program stored thereon, said computer program causing a computer to define a data structure of drawing data of a drawing primitive, wherein:

the drawing data contains pixel data of the drawing primitive rasterized by the computer on a per rectangular pixel set basis, the rectangular pixel set containing at least one pixel; and information relating to sub-pixels is compressively encoded by the computer on the per rectangular pixel set basis by run length encoding in accordance with the number of the same contiguous pieces of data, wherein the information relating to the sub-pixels is data, expressed in binary form, resulting from a determination made on a per sub-pixel basis as to whether a sub-pixel is inside or outside the drawing primitive, and the binary value of sub-pixels along with the non-binary value of pixels are run-length encoded.

11. A computer-readable recording medium having a computer program stored thereon, said program causing a computer to execute the steps of:

receiving by the computer, on a per rectangular pixel set basis, pixel data of a drawing primitive rasterized on the per rectangular pixel set basis, the rectangular pixel set containing at least one pixel; and compressively encoding by the computer information relating to sub-pixels on the per rectangular pixel set basis by run length encoding in accordance with the number of the same contiguous pieces of data, wherein the information relating to the sub-pixels is data, expressed in binary form, resulting from a determination made on a per sub-pixel basis as to whether a sub-pixel is inside or outside the drawing primitive, and the binary value of sub-pixels along with the non-binary value of pixels are run-length encoded.

12. A computer-readable recording medium having a computer program stored thereon, said program causing a computer to execute the steps of:

receiving by the computer drawing data with information relating to sub-pixels compressively encoded by run length encoding on a per rectangular pixel set basis, including pixel data of a drawing primitive rasterized on the per rectangular pixel set basis, the rectangular pixel set containing at least one pixel; and acquiring by the computer a run length code indicative of a starting position at which a significant value appears for the first time in each row or each column of a data matrix of the sub-pixels within the rectangular pixel set and the number of contiguous significant values from the starting position in the row or column to decode the data matrix of the sub-pixels within the rectangular pixel set on a per row or per column basis, wherein the information relating to the sub-pixels is data, expressed in binary form, resulting from a determination made on a per sub-pixel basis as to whether a sub-pixel is inside or outside the drawing primitive, and the binary value of sub-pixels along with the non-binary value of pixels are run-length encoded.

* * * * *